United States Patent [19]

Nordholt et al.

[11] Patent Number: 4,580,294
[45] Date of Patent: Apr. 1, 1986

[54] OPTICAL TRANSMITTER

[75] Inventors: Ernst H. Nordholt, Berkel en Rodenrijs; Leendert P. de Jong, Reeuwijk, both of Netherlands

[73] Assignee: U.S. Philips Corporation, New York, N.Y.

[21] Appl. No.: 600,270

[22] Filed: Apr. 13, 1984

[30] Foreign Application Priority Data

Apr. 27, 1983 [NL] Netherlands .......................... 8301484

[51] Int. Cl.⁴ .............................................. H04B 9/00
[52] U.S. Cl. ...................... 455/613; 372/33; 372/38; 455/618
[58] Field of Search .............. 455/613, 618, 606, 607, 455/609, 611, 617; 372/25, 29, 30, 31, 33, 38; 332/7.51

[56] References Cited

U.S. PATENT DOCUMENTS 3,898,583  8/1975  Shuey ...................................... 372/33
4,369,525  1/1983  Breton et al. ........................... 372/33

FOREIGN PATENT DOCUMENTS 2025121  1/1980  United Kingdom ................. 372/29

Primary Examiner—Joseph A. Orsino, Jr.
Attorney, Agent, or Firm—Thomas A. Briody; William J. Streeter; Leroy Eason

[57] ABSTRACT

A transmitter employing a light-emitting diode as an output element, this element being included in series with a resistor in the output circuit of a difference amplifier the inverting input of which is coupled to the junction point of the diode and resistor, includes a network for compensating for the non-linear output power versus energizing current characteristic of the diode. This network comprises a field effect transistor (fet) biased to operate in the pre-pinch-off region and having its source-drain path connected to the diode. The source-drain path of the FET may shunt the diode and a further resistor in series therewith, or alternatively may be included in a feedback path to the inverting input of the amplifier.

4 Claims, 4 Drawing Figures

OPTICAL TRANSMITTER

The invention relates to an optical transmitter for converting electrical analog baseband signals into corresponding intensity-modulated optical signals, comprising a difference amplifier whose output circuit contains the series arrangement of a light-emitting diode having a non-linear transfer characteristic and a resistor, the inverting input of the difference amplifier being coupled to the junction point of the light-emitting diode and the resistor. In optical transmission systems, light-emitting diodes are often as light sources for reasons of cost. As a consequence of the nonlinear current versus light characteristic of such diodes higher harmonics and intermodulation products occur, which seriously impair the quality of signal transfer in such transmitting systems. For this reason light-emitting diodes are mainly used in optical digital transmission systems and in those optical transmission systems employing analog intensity modulation which are not required to meet unduly high demands.

Various methods are known by means of which the influence of nonlinearities in the transfer characteristic of light-emitting diodes can be compensated for. For example, feedback methods are known. In these methods expensive optical components such as power splitters are required and, furthermore, a part of the total optical power is not available for transmission purposes. Feed-forward methods are also known. These require optical power coupling devices, which are also expensive. The two methods mentioned are thus often complicated and expensive, which makes them not very suitable for application in inexpensive transmission systems.

Compensation methods that use a second light-emitting diode of the same kind connected in series with the light-emitting diode whose characteristic is to be compensated for are also known. The output signal of the second light-emitting diode, which is converted back to an electrical signal by means of for example a PIN diode, is fed back to the input, resulting in cross-compensation for the nonlinear transfer characteristic of the first light-emitting diode. However, only a small amount of compensation for the nonlinearities may be realised using these methods.

It is an object of the invention to enable the above-mentioned drawbacks to be mitigated and to provide an optical transmitter which can be extremely suitable for use in, for example, inexpensive transmission systems for baseband television signals.

The invention provides an optical transmitter for converting electrical analog baseband signals into corresponding intensity-modulated optical signals, comprising a difference amplifier whose output circuit contains a series arrangement of a light-emitting diode having a non-linear transfer characteristic and a resistor, the inverting input of the difference amplifier being coupled to the junction point of the light-emitting diode and the resistor, the light-emitting diode being coupled to a field-effect transistor which is biased so that in operation the voltage between its drain and gate electrode will be less than the pinch off voltage. The field-effect transistor will at least partly compensate for the nonlinear transfer characteristic of the light-emitting diode.

Embodiments of the invention will be described, by way of example, with reference to the accompanying diagrammatic drawings in which FIG. 1 is the circuit diagram of a first embodiment, FIG. 2 shows an optical output power versus energising current characteristic of a light-emitting diode.

Figure 1:
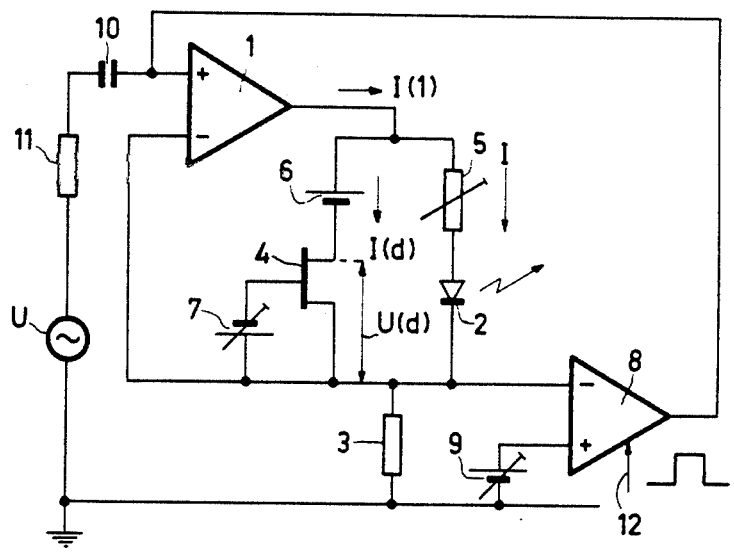

In FIG. 1 an optical transmitter comprises a difference amplifier 1 whose output is connected to a point of constant potential via the series arrangement of a variable resistor 5, a light-emitting diode 2 and a resistor 3. The series arrangement of a direct-voltage source 6 and the source-drain path of a field-effect transistor 4 is connected between the output of the difference amplifier 1 and the junction point of the light-emitting diode 2 and the resistor 3. The control or gate electrode of the field-effect transistor 4 is connected via a direct-voltage source 7 to the drain electrode of the field-effect transistor 4. The inverting input of the difference amplifier 1 is connected to the junction point of the light-emitting diode 2 and the resistor 3. The said junction point is also connected to the inverting input of a difference amplifier 8, whose output is connected to the non-inverting input of the difference amplifier 1. The non-inverting input of the difference amplifier 8 is connected, via a variable direct-voltage source 9, to a point of constant potential. An input signal U is fed, via a resistor 11 and a capacitor 10, to the non-inverting input of the difference amplifier 1.

Figure 2:
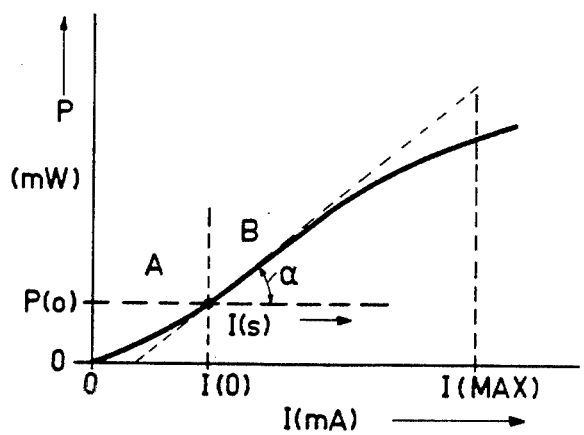

The optical output power P of the light-emitting diode as a function of the current I through it has the general form of the characteristic shown in FIG. 2. The region A on the left of the line I=I(0) is not suitable for transmission purposes because of its strong curvature. In the region B to the right of the line I=I(0) characteristic is more or less straight and can therefore be used for transmission purposes. In this region B the relation between the optical output power P and the current I through the light-emitting diode is given by:

$$P = P_o + \alpha(1) \cdot I(s) - \alpha(2) I^2(s) \qquad (1)$$

where $\alpha(1)$ and $\alpha(2)$ are positive constants and $I(s)$ is the signal current, e.g. a video signal. The base level of the synchronizing pulses then corresponds to $I(0)$ and the peak-white level to $I(max)$. The optical power P, given proper compensation, should be proportional to the control current I(1) through the combination of the light-emitting diode 2 and the field-effect transistor 4. For this to be the case I(1) must satisfy:

$$I(1) = I(0)^1 + \beta(1) \cdot I(s) - \beta(2) \cdot I^2(s) \qquad (2)$$

where $\beta(2)/\beta(1) = \alpha(2)/\alpha(1)$ and $I(0)^1$ is the current through the field-effect transistor 4. The field-effect transistor 4 is biased for operation in its triode region. This is the region in which the voltage between the drain electrode and the gate electrode of the field-effect transistor 4 is smaller than the threshold voltage or "pinch-off" voltage U(p). In this region the operation of the field-effect transistor can be described by the following equation:

$$I(d) = g_o \cdot U(d) \cdot \left( 1 - \frac{U(g)}{U(p)} - \frac{U(d)}{2U(p)} \right) \qquad (3)$$

Here:

U(g) is the voltage on the gate electrode, w.c.t. the source electrode
U(d) is the voltage on the drain electrode, w.c.t. the source electrode
I(d) is the drain current
U(p) is the pinch-off voltage $$g_o = U \cdot C_o(W/L) U(p).$$

where
W is the channel width
L is the channel length
U is the electron mobility in an N-FET or the hole mobility in a P-FET
$C_o$ is the capacitance between the gate electrode and the substrate per unit surface.

Figure 3:
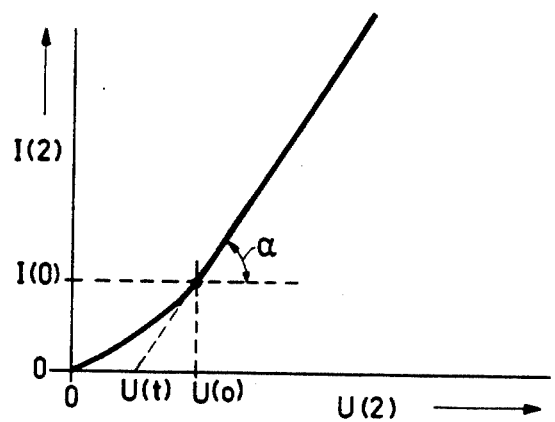
FIG. 3 shows a current-voltage characteristic of a light-emitting diode.

From the characteristic shown in FIG. 3 it will be obvious that a light-emitting diode may be considered as being a series arrangement of a constant-voltage source having voltage U(t) and a resistor whose value is equal to cot g.($\alpha$). For the voltage U(d) in the embodiment of FIG. 1 the following expression holds:

$$U(d) = U(t) + I(s) \cdot R \tag{4}$$

where R is the sum of the resistances of the resistor 5 and the light-emitting diode 2. It further holds that:

$$I(1) = I(o) + I(s) + I(d) \tag{5}$$

where I(s) is the signal current through the light-emitting diode 2 and I(d) is the drain current of the field-effect transistor 4. Combination of relations (3), (4) and (5) yields the equations:

$$I(1) = I^1(o) + \beta(1) \cdot I(s) - \beta(2) I^2(s) \tag{6}$$

where $$I^1(o) = I(o) + g_o \cdot U(o) \left( 1 - \frac{U(g)}{U(p)} - \frac{U(o)}{2U(p)} \right)$$

$$\beta(1) = 1 + g_o \cdot R \left( 1 - \frac{U(g)}{U(p)} - \frac{U(o)}{U(p)} \right)$$

$$\beta(2) = g_o \cdot \frac{R^2}{2U(p)}$$

The two coefficients $\beta(1)$ and $\beta(2)$ can be adjusted by means of the voltage source 7 and the resistor 5 to the values required for compensating for the nonlinear static transfer characteristic of the light-emitting diode 2.

A television signal can be fed to the light-emitting diode in the form of a current which is such that the base level of the synchronization pulses corresponds to I(o) and the maximum white level corresponds to I(-max); see FIG. 2. This can be implemented in known manner by means of the operational amplifier 8 and the reference voltage source 9. The operational amplifier 8 only produces curent during the occurrence of the base level of the synchronizing pulses of the video signal. The non-inverting input of amplifier 8 is set during the occurrrence of the base level of the synchronization pulses to a voltage value such that a current $I^1(o) = U(9)/R(3)$ flows through the parallel combination of the light-emitting diode 2 and the field effect transistor 4, where $I^1(o)$ is defined in the relation (6), U(q) is the voltage across the reference source and R(3) is the resistance value of resistor 3. The current $I^1(o)$ corresponds to the current I(o) through the light-emitting diode 2, as a result of which the optical power from the light-emitting diode is held at the value P(o) during the occurrence of the synchronization pulses; see FIG. 2.

Figure 4:
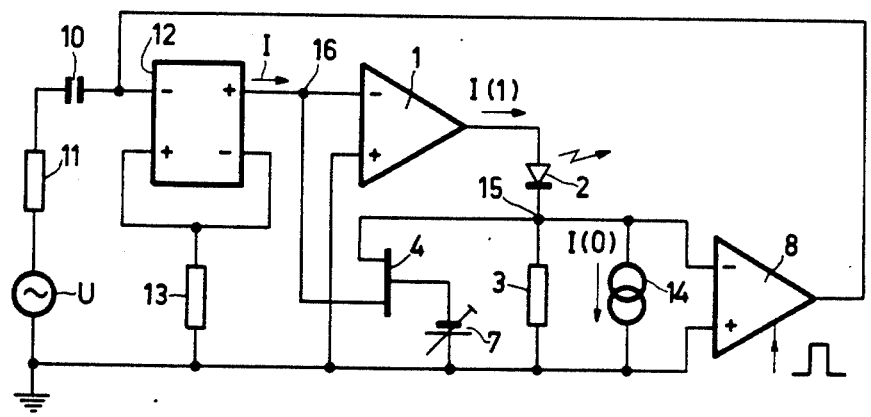
FIG. 4 is the circuit diagram of a second embodiment.

In FIG. 4 an optical transmitter comprises a transconductance amplifier 12 which is used for converting the input voltage U into an input current I, this current then being fed, to the input (−) of the amplifier 1 and the source-drain path of the field-effect transistor 4, whose gate electrode is connected via the variable voltage source 7 to a point of constant potential. Transistor 4 is again operated in the pre pinch off or triade region. The output of amplifier 1 is connected via the series arrangement of the light-emitting diode 2 and the resistor 3 to a point of constant potential. The junction point of diode 2 and resistor 3 is connected via the source-drain path of transistor 4 to the inverting input of amplifier 1. A current source 14 is connected in parallel with the resistor 3 and between the two inputs of amplifier 8. The output of amplifier 8 is connected to the input of amplifier 12.

The transductance amplifier 12 converts the input signal U into a current I given by $$I = U/R(13)$$

where R(13) is the value of resistor 13. Provided that the open loop gain of amplifier 1 is sufficiently large, the current I(1) through the light-emitting diode 2 is given by the following relation:

$$I(1) = \left( 1 + \frac{R(4)}{R(3)} \right) \cdot I \approx \frac{R(4)}{R(3)} \cdot I \tag{7}$$

Here R(4) is the resistance between the points 15 and 16 in FIG. 4 and R(3) in the resistance value of resistor 3. In normal operation, $R(4) >> R(3)$. The optical output power P of the light-emitting diode 2 and the corresponding current I(1) through the light-emitting diode 2 satisfy here too the relations (1) and (2) quoted earlier. A simple calculation shows that in this case the positive constants $\beta(1)$ and $\beta(2)$ satisfy:

$$\beta(1) = g_o (1 - \frac{U(g)}{U(p)} \cdot R(3) \text{ and } \beta(2) = g_o \frac{R^2(3)}{2U(p)} \tag{8}$$

Compared with the embodiment of FIG. 1, it is now only necessary to adjust the voltage U(g) of the source 7 in order to achieve the desired compensation for the nonlinear static transfer characteristic of the light-emitting diode 2.

The voltage on capacitor 10 is adjusted by means of amplifier 8 to be such that, during the occurrence of the synchronization pulses, the voltage across resistor 3 is zero. Consequently, during this time the output current I(o) of the current source 14 will flow through the light-emitting diode 2, as required; see FIG. 2.

What is claimed is:
1. An optical transmitter for converting electrical analog baseband signals into corresponding intensity-modulated optical signals, comprising a difference amplifier having an output terminal which is connected to the series arrangement of a light-emitting diode having a non-linear transfer characteristic and a first resistor; the difference amplifier further having an inverting input terminal which is coupled to the junction point of the light-emitting diode and the first resistor; the light-emitting diode being coupled to the source-drain path of a field-effect transistor; the field-effect transistor being biased so that in operation the voltage between the drain and gate electrodes thereof will be less than the pinch-off voltage; whereby the field-effect transistor will at least partly compensate for the nonlinear transfer characteristic of the light-emitting diode.

2. A transmitter as claimed in claim 1, in which the source-drain path of the field-effect transistor is connected between said inverting input of the difference amplifier and said junction point of the light-emitting diode and the first resistor.

3. A transmitter as claimed in claim 1, in which a variable second resistor is connected between said output terminal of the difference amplifier and said light-emitting diode, and the source-drain path of the field-effect transistor is connected between said output terminal of the difference amplifier and said junction point of the light-emitting diode and the first resistor.

4. A transmitter as claimed in claim 3, in which the junction point of the light-emitting diode and said first resistor is directly connected to the inverting input terminal of the difference amplifier.

* * * * *